US012570002B2

(12) United States Patent
Dong et al.

(10) Patent No.: US 12,570,002 B2
(45) Date of Patent: Mar. 10, 2026

(54) TELEOPERATION ASSIST DEVICE, TELEOPERATION ASSIST METHOD, AND STORAGE MEDIUM

(71) Applicant: HONDA MOTOR CO., LTD., Tokyo (JP)

(72) Inventors: Yili Dong, Wako (JP); Akira Mizutani, Wako (JP); Tomohiro Chaki, Wako (JP); Tomoki Watabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 18/080,797

(22) Filed: Dec. 14, 2022

(65) Prior Publication Data

US 2023/0234231 A1 Jul. 27, 2023

(30) Foreign Application Priority Data

Jan. 24, 2022 (JP) ................................. 2022-008829

(51) Int. Cl.
| | |
|---|---|
| *B25J 9/16* | (2006.01) |
| *G05B 19/4155* | (2006.01) |
| *G06F 3/01* | (2006.01) |

(52) U.S. Cl.
CPC ........... B25J 9/1689 (2013.01); B25J 9/1633 (2013.01); B25J 9/1682 (2013.01); (Continued)

(58) Field of Classification Search
CPC ...... B25J 9/1689; B25J 9/1669; B25J 9/1612; B25J 9/1687; B25J 9/1633; B25J 9/1682; (Continued)

(56) References Cited

U.S. PATENT DOCUMENTS

| | | | |
|---|---|---|---|
| 2013/0006267 A1* | 1/2013 | Odermatt | ............... B25J 9/1628 901/41 |
| 2020/0130178 A1* | 4/2020 | Colasanto | ................ B25J 9/163 |

(Continued)

FOREIGN PATENT DOCUMENTS

| | | |
|---|---|---|
| JP | 2004-213673 | 7/2004 |
| JP | 2017-064831 | 4/2017 |

OTHER PUBLICATIONS

Feix, et al. "The GRASP Taxonomy of Human Grasp Types", IEEE Transactions on Human-Machine Systems (vol. 46, No. 1, Feb. 2016), IEEE, p. 66-77.

(Continued)

*Primary Examiner* — Khoi H Tran
*Assistant Examiner* — Tanner L Cullen
(74) *Attorney, Agent, or Firm* — Amin, Turocy & Watson, LLP

(57) ABSTRACT

A teleoperation assist device includes: a motion acquiring unit configured to acquire information on a motion of an operator who operates an end effector; an intention estimating unit configured to estimate a target object which is a target operated by the end effector and a task which is an operation method of the target object using the information acquired by the motion acquiring unit; an environmental status determining unit configured to acquire environment information of an environment in which the end effector is operated; a parameter setting unit configured to acquire information from the intention estimating unit and the environmental status determining unit and to set parameters of an operation type of the end effector from the acquired information; and an end effector operation determining unit configured to determine an amount of operation of the end effector on the basis of taxonomy which is the set parameters and the information acquired by the motion acquiring unit.

8 Claims, 6 Drawing Sheets

(52) U.S. Cl.
CPC .................... *G05B 19/4155* (2013.01); *G05B 2219/40184* (2013.01); *G06F 3/014* (2013.01)

(58) Field of Classification Search
CPC ......... B25J 9/1684; G05B 2219/35448; G05B 2219/35464; G05B 2219/36452; G05B 2219/40184; G05B 2219/40195; G05B 2219/39505; G05B 2219/40183; G06F 3/014; G06F 3/0346
See application file for complete search history.

(56) References Cited

U.S. PATENT DOCUMENTS

| | | | | |
|---|---|---|---|---|
| 2021/0086364 | A1* | 3/2021 | Handa | G06V 20/56 |
| 2021/0353381 | A1* | 11/2021 | Usui | A61B 90/50 |
| 2021/0370506 | A1* | 12/2021 | Yamane | B25J 9/1658 |
| 2022/0015846 | A1* | 1/2022 | Li | A61B 34/30 |
| 2023/0166398 | A1* | 6/2023 | Fan | B25J 9/1653 |
| | | | | 700/255 |
| 2023/0173660 | A1* | 6/2023 | Wang | B25J 9/1697 |
| | | | | 700/262 |
| 2023/0373078 | A1* | 11/2023 | Azuma | B25J 3/00 |

OTHER PUBLICATIONS

Japanese Office Action for Japanese Patent Application No. 2022-008829 mailed Aug. 26, 2025.

\* cited by examiner

TELEOPERATION ASSIST DEVICE, TELEOPERATION ASSIST METHOD, AND STORAGE MEDIUM

CROSS-REFERENCE TO RELATED APPLICATION

Priority is claimed on Japanese Patent Application No. 2022-008829, filed Jan. 24, 2022, the content of which is incorporated herein by reference.

BACKGROUND OF THE INVENTION

Field of the Invention

The present invention relates to a teleoperation assist device, a teleoperation assist method, and a storage medium.

Description of Related Art

Teleoperation techniques for robots or the like have attracted attention in recent years. In such teleoperation, for example, sensors are mounted on a human operator, various types of information are accurately read from the operator, and detailed instructions are given to a robot side to control the robot. In teleoperation, by allowing a robot to acquire sensations (such as a tactile force or vocal sound) through interactions with an environment using sensors and to give a feeling of reality to an operator by feeding back the sensations to the operator, the operator is prompted to more accurately give a next command In such teleoperation, an operator has to wear a complicated system including plentiful sensors (for example, see Japanese Unexamined Patent Application, First Publication No. 2004-213673 (hereinafter referred to as Patent Document 1)).

SUMMARY OF THE INVENTION

However, in the related art or the like described in Patent Document 1, the system is expensive and preparation such as attaching sensors or the like to an operator takes much time.

Aspects of the present invention were made in consideration of the aforementioned circumstances and an objective thereof is to provide a teleoperation assist device, a teleoperation assist method, and a storage medium that can allow teleoperation of a robot to be performed more simply than in the related art.

In order to solve the aforementioned problems and to achieve the aforementioned objective, the present invention employs the following aspects.

(1) A teleoperation assist device according to an aspect of the present invention is a teleoperation assist device that remotely operates at least an end effector, the teleoperation assist device including: a motion acquiring unit configured to acquire information on a motion of an operator who operates at least the end effector; an intention estimating unit configured to estimate a target object which is a target operated by the end effector and a task which is an operation method of the target object using the information acquired by the motion acquiring unit; an environmental status determining unit configured to acquire environment information of an environment in which the end effector is operated; a parameter setting unit configured to acquire information from the intention estimating unit and the environmental status determining unit and to set parameters of an operation type of at least the end effector from the acquired information; and an end effector operation determining unit configured to determine an amount of operation of the end effector on the basis of taxonomy which is the set parameters and the information acquired by the motion acquiring unit.

(2) In the aspect of (1), the parameters may include taxonomy, object shape information of the target object, information indicating a task which is performed with a single hand, information indicating a task which is performed with two hands, margin information for interference avoidance, and a target torque.

(3) In the aspect of (1) or (2), the teleoperation assist device may further include a moving means operation determining unit configured to determine an amount of operation of a moving means connected to the end effector and configured to move the end effector on the basis of the parameters and information from the motion acquiring unit.

(4) In the aspect of (3), the moving means operation determining unit may include: a geometric restriction control unit configured to perform control such that the moving means is able to maintain a restricted motion along a surface of the target object using a wrist command value associated with a position and movement of a wrist of the operator, object shape information of the target object which is the parameters, and information indicating a task which is performed with a single hand or information indicating a task performed with two hands which is the parameters; a joint angle command generating unit configured to give a target position and a target posture of the moving means using a command value generated by the geometric restriction control unit and margin information for interference avoidance which is the parameters and to generate a joint angle command value for the moving means; and a torque control unit configured to generate a joint target torque command value using the joint angle command value and a target torque which is the parameters and to control a torque of the moving means on the basis of the generated joint target torque command value.

(5) In the aspect of (4), the parameter setting unit may be configured to output an instruction to invalidate a process to the geometric restriction control unit when a shape of the target object is atypical.

(6) In the aspect of (4) or (5), the number of moving means and the number of end effectors may be two or more, the end effector operation determining unit may be configured to perform control such that the plurality of end effectors operate in cooperation, and the moving means operation determining unit may be configured to perform control such that the plurality of moving means operate in cooperation.

(7) In one of the aspects of (1) to (6), the information on the motion of the operator may include information of a position of a finger of the operator, movement of a finger of the operator, a gaze of the operator, a position of a wrist of the operator, and movement of a wrist of the operator.

(8) A teleoperation assist method according to another aspect of the present invention is a teleoperation assist method that is performed by a teleoperation assist device remotely operating at least an end effector, the teleoperation assist method including: causing a motion acquiring unit to acquire information on a motion of an operator who operates at least the end effector; causing an intention estimating unit to estimate a target object which is a target operated by the end effector and a task which is an operation method of the target object using the information acquired by the motion acquiring unit; causing an environmental status determining unit to acquire environment information of an environment in which the end effector is operated; causing a parameter setting unit to acquire information from the intention estimating unit and the environmental status determining unit and to set parameters of an operation type of at least the end effector from the acquired information; and causing an end effector operation determining unit to determine an amount of operation of the end effector on the basis of taxonomy which is the set parameters and the information acquired by the motion acquiring unit.

(9) A non-transitory computer-readable storage medium according to another aspect of the present invention is a non-transitory computer-readable storage medium storing a program causing a computer of a teleoperation assist device remotely operating at least an end effector to perform: acquiring information on a motion of an operator who operates at least the end effector and a moving means; estimating a target object which is a target operated by the end effector and a task which is an operation method of the target object using the acquired information on the motion of the operator; acquiring environment information of an environment in which the end effector is operated; acquiring the target object which is to be operated, the task which is an operation method of the target object, and the environment information and setting parameters of an operation type of at least the end effector from the acquired information; and determining an amount of operation of the end effector on the basis of taxonomy which is the set parameters and the information on the motion of the operator.

According to the aspects of (1) to (9), it is not necessary to attach an exoskeleton which is expensive and hard to attach.

DETAILED DESCRIPTION OF THE INVENTION

Figure 1:
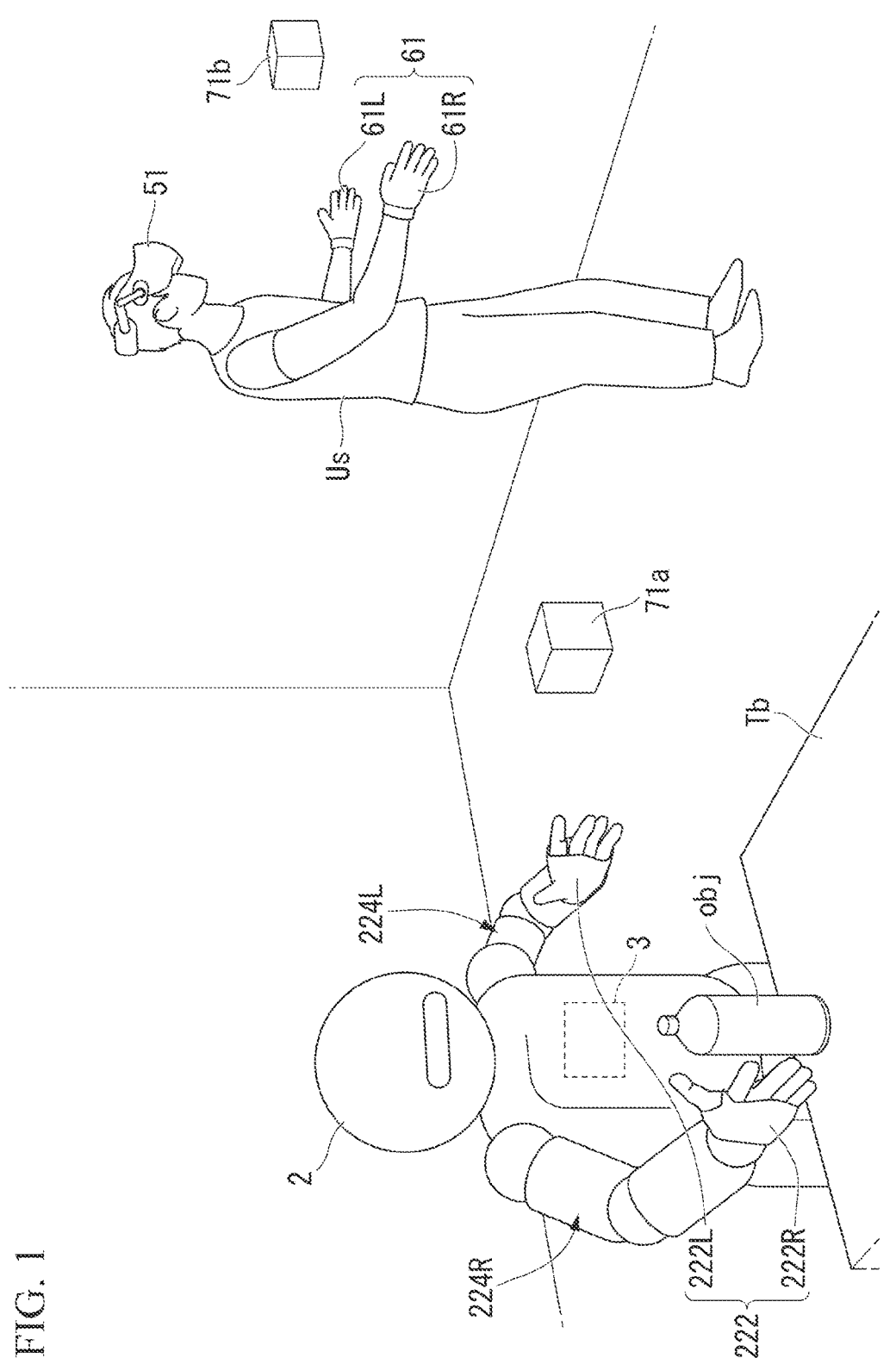
FIG. 1 is a diagram schematically illustrating teleoperation of a robot.

Hereinafter, an embodiment of the present invention will be described with reference to the accompanying drawings.

In the drawings mentioned in the following description, scales of members are appropriately changed to illustrate the members in recognizable sizes.

In all the drawings mentioned in the following description of embodiment, the same elements having the same functions will be referred to by the same reference signs and description thereof will not be repeated.

"On the basis of XX" mentioned in this specification means "on the basis of at least XX" and includes cases of "on the basis of another element in addition to XX." "On the basis of XX" is not limited to cases in which XX is directly used, but includes cases of "on the basis of a result obtained by performing calculation or processing on XX." "XX" is an arbitrary element (for example, arbitrary information).

Summary of Teleoperation

First, teleoperation will be schematically described below.

FIG. 1 is a diagram schematically illustrating teleoperation of a robot. As illustrated in FIG. 1, an operator Us wears, for example, a head-mounted display (HMD) 51 and a controller 61 (61L, 61R). In a work space, an environmental sensor 71 (71a, 71b) is installed. The environmental sensor 71 may be attached to a robot 2. The robot 2 includes a teleoperation assist device 3, an end effector 222 (222L, 222R), and a moving means 224 (224L, 224R). The environmental sensor 71 includes, for example, an RGB camera and a depth sensor. The operator remotely controls the robot 2, for example, by moving a hand or a finger to which the controller 61 is attached while seeing an image displayed on the HMD 51.

Example of Configuration of Teleoperation Assist System

Figure 2:
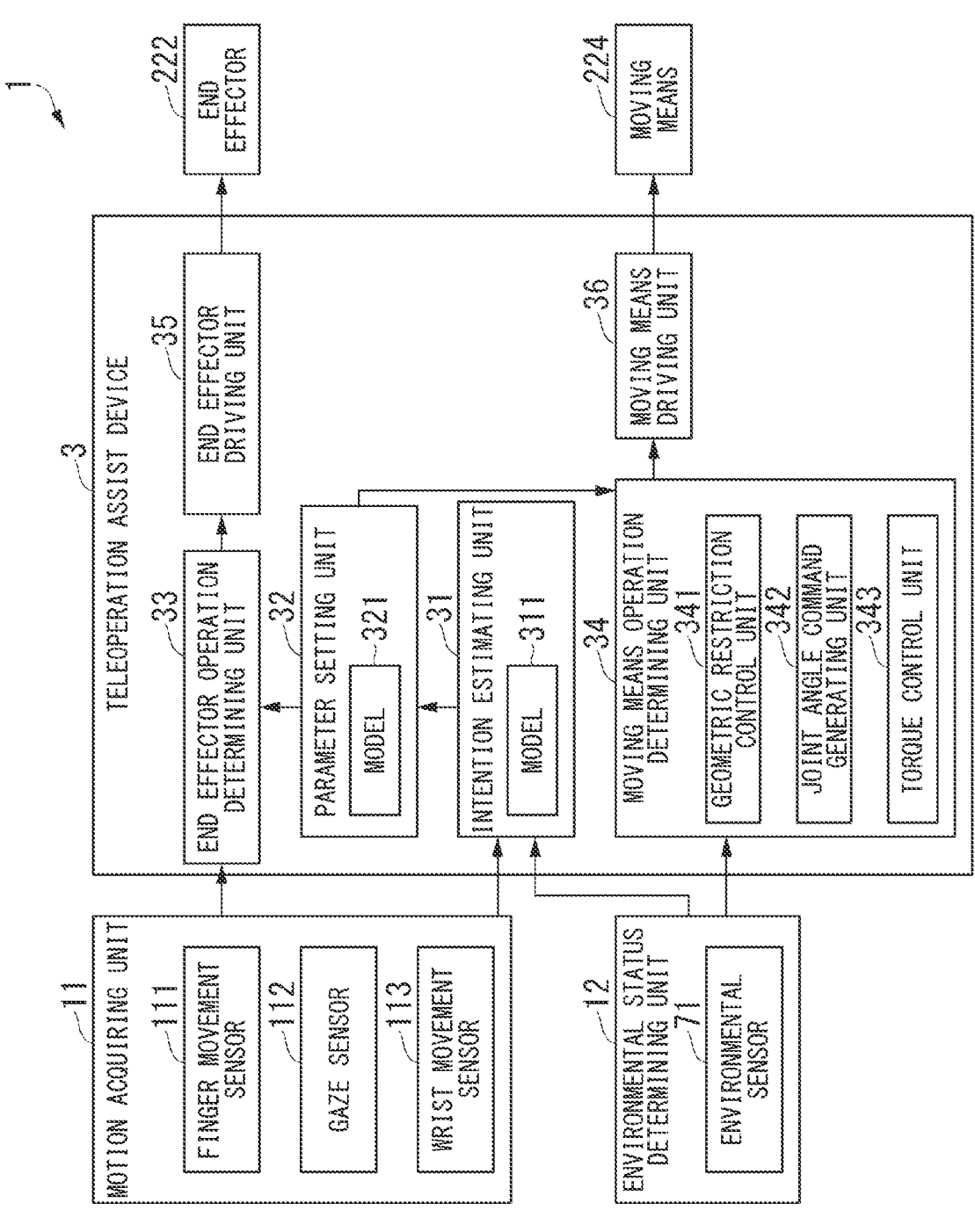
FIG. 2 is a diagram illustrating an example of a configuration of a teleoperation assist system according to an embodiment.

An example of a configuration of a teleoperation assist system 1 and an example of functions of constituents thereof will be described below. FIG. 2 is a diagram illustrating an example of a configuration of a teleoperation assist system according to an embodiment.

An example of the configuration will be first described below.

As illustrated in FIG. 2, the teleoperation assist system 1 includes a motion acquiring unit 11, an environmental status determining unit 12, a teleoperation assist device 3, an end effector 222, and a moving means 224.

The motion acquiring unit 11 includes, for example, a finger movement sensor 111, a gaze sensor 112, and a wrist movement sensor 113.

The environmental status determining unit 12 includes, for example, an environmental sensor 71.

The teleoperation assist device 3 includes, for example, an intention estimating unit 31, a parameter setting unit 32, an end effector operation determining unit 33, a moving means operation determining unit 34, an end effector driving unit 35, and a moving means driving unit 36.

The intention estimating unit 31 includes a model 311.

The parameter setting unit 32 includes a model 321.

The moving means operation determining unit 34 includes, for example, a geometric restriction control unit 341, a joint angle command generating unit 342, and a torque control unit 343.

Functional examples of the constituent units will be described below.

The motion acquiring unit 11 acquires information on a motion of a human operator.

The finger movement sensor 111 is, for example, a six-axis sensor, an acceleration sensor, or a vibration sensor. The finger movement sensor 111 is provided, for example, in the controller 61. The finger movement sensor 111 detects a fingertip command value including a position of each finger of the human operator and movement of each finger and outputs the detected fingertip command value to the teleoperation assist device 3. Acquisition of the fingertip command value is performed, for example, at intervals of a predetermined time.

The gaze sensor 112 is a sensor that detects movement of a gaze of the human operator. The gaze sensor 112 is provided, for example, in the HMD 51. The gaze sensor 112 detects movement of a gaze of the human operator and outputs the detected gaze information to the teleoperation assist device 3. Acquisition of gaze information is performed, for example, at intervals of a predetermined time.

The wrist movement sensor 113 is, for example, a six-axis sensor, an acceleration sensor, or a vibration sensor. The wrist movement sensor 113 is provided, for example, in the controller 61. The wrist movement sensor 113 detects a human wrist command value including a position and movement (such as a rotation angle) of a wrist of the human operator and outputs the detected human wrist command value to the teleoperation assist device 3. Acquisition of the human wrist command value is performed, for example, at intervals of a predetermined time.

The environmental status determining unit 12 acquires environment information in which the robot 2 is operated. The environmental status determining unit 12 recognizes a position of a target object, a posture of the target object, a type of the target object, a shape of the target object, and the like using detection information detected by the environmental sensor 71 and outputs the recognized information on the target object to the teleoperation assist device 3. The environmental status determining unit 12 recognizes a target object and a position, a size, a shape, or the like of an obstacle when the obstacle is interposed between the target object and the end effector 222 using the acquired information. For example, when a can, a plastic bottle, a glass bottle are placed on a table, a task target of the operator is the plastic bottle, and the plastic bottle is interposed between the can and the glass bottle, for example, the can is recognized as an obstacle.

The environmental sensor 71 is, for example, a RGB-D camera and acquires RGB information and depth information. The number of environmental sensors 71 may be two or more. The environmental sensor 71 detects RGB information and depth information. Acquisition of the information is performed, for example, at intervals of a predetermined time.

The teleoperation assist device 3 sets parameters required for control of the robot 2 using the information acquired from the motion acquiring unit 11 and the environmental status determining unit 12. The teleoperation assist device 3 generates amounts of operation of the end effector 222 and the moving means 224 using the set parameters. Examples of the parameters include taxonomy information, object shape information, an interference avoidance margin, and a target torque. Taxonomy will be described later.

The intention estimating unit 31 inputs the acquired information on a target object and the acquired detection information on the movement of the fingers of the human operator, and the acquired gaze information to a trained model 311 and estimates a task and a target (a target object) which are intended by the operator. Examples of a type of a task include a pick & place task and a peg-in-hole task. The target information includes, for example, a name of a target object (including a shape and a weight thereof), information indicating which of a plurality of objects is a target, and information of a position of a screw hole in case of screwing or the like. Since information is input at intervals of a predetermined time, the estimated task information and the estimated target information may change according to the acquired information. For example, when objects A to D are placed on a table and the target is estimated to be object A, first, the target may be estimated to be object B on the basis of a relationship between a position of a fingertip or a position of a wrist and a position of an object. The intention estimating unit 31 calculates a distance between a fingertip and a target object on the basis of a position of the target object included in the information on a target object and a fingertip based on a position of a fingertip and a position of an object. A method of training the model 311 will be described later.

The parameter setting unit 32 sets parameters by inputting the task information and the target information acquired from the intention estimating unit 31 to the trained model 321. For example, the parameter setting unit 32 outputs taxonomy information out of the set parameters to the end effector operation determining unit 33. For example, the parameter setting unit 32 outputs object shape information and one-hand task information or two-hand task information out of the set parameters to the geometric restriction control unit 341. For example, the parameter setting unit 32 outputs interference avoidance margin information out of the set parameters to the joint angle command generating unit 342. For example, the parameter setting unit 32 outputs target torque information out of the set parameters to the joint angle command generating unit 342.

The end effector operation determining unit 33 determines an amount of operation of the end effector 222 using the detection information detected by the finger movement sensor 111 and the taxonomy information set by the parameter setting unit 32. When the task is a two-hand task, the end effector operation determining unit 33 performs control such that the end effectors 222L and 222R perform the task in cooperation.

The end effector driving unit 35 drives the end effector 222 on the basis of an end effector operation amount output from the end effector operation determining unit 33.

The end effector 222 is, for example, a gripper of a robot. The end effector 222 includes, for example, a base body and at least two fingers connected to the base body. For example, as illustrated in FIG. 1, each end effector 222 includes a moving means.

The moving means operation determining unit 34 determines an amount of operation of the moving means 224 using the detection information detected by the human wrist movement sensor 113 and the parameters set by the parameter setting unit 32. When the task is a two-hand task, the moving means operation determining unit 34 performs control such that the moving means 224L and 224R operate in cooperation. The moving means operation determining unit 34 performs processes in cooperation with the end effector operation determining unit 33.

The geometric restriction control unit 341 acquires the object shape information, the one-hand task information or two-hand task information, and the detection information detected by the wrist movement sensor 113. The geometric restriction control unit 341 generates a restricted command value such that collision with the target object is prevented and falls into a grip range by correcting the wrist command value. For example, a restricted motion means that the end effector can move along the surface of the object with maintaining an appropriate relative distance (with no collision and no separation) in which the target object can be gripped at any time when the target object is intended to be gripped. Accordingly, a system that is tolerable even when an operator's hand blurs or mistakes more or less at the time of teleoperation is achieved. The geometric restriction control unit 341 may invalidate this process in case of an atypical material or the like. In this case, for example, the parameter setting unit 32 outputs invalidation information to the geometric restriction control unit 341. Alternatively, when the same object as the recognized object is not included in the model 321, the parameter setting unit 32 may output parameters associated with an object having similarity thereto to the geometric restriction control unit 341. In this case, for example, the parameter setting unit 32 may calculate a score through pattern matching with images of candidates for a target object stored in the model 321 and select an object with the highest score as a similar object.

The joint angle command generating unit 342 acquires the restricted command value from the geometric restriction control unit 341 and the interference avoidance margin information from the parameter setting unit 32 and generates a joint angle command value on the basis of the acquired restricted command value and the acquired interference avoidance margin information. The joint angle command generating unit 342 is, for example, an inverse kinematics (IK) solver. The IK solver is a solution for generating joint angles of the robot 2 as a whole by giving target position and posture of the moving means. The joint angle command generating unit 342 generates a joint command value for interference avoidance unlike the IK solver according to the related art. That is, the generated joint angle command value has a degree of freedom in redundancy for avoiding interference (maintaining a margin).

The torque control unit 343 acquires the join angle command value from the joint angle command generating unit 342 and the target torque information from the parameter setting unit 32 and generates operation amount information on the basis of the acquired joint angle command value and the acquired target torque information. A reason for requiring the target torque information is that it is difficult to estimate a required torque when a desk is cleaned, when a bolt is loosened or fastened with a wrench, or the like. Accordingly, in this embodiment, the parameter setting unit 32 estimates a target torque corresponding to a task such that a target tactile force or a target moment is realized. In comparison with a position-control robot in the related art, a torque-control robot can reduce damage due to unexpected environmental collision.

The moving means driving unit 36 drives the moving means 224 on the basis of the operation amount information output from the moving means operation determining unit 34.

The moving means 224 is, for example, a robot arm which is connected to the end effector 222. The moving means may be, for example, a robot arm such as a scalar robot or a part supporting a bogie as long as it can move the end effector 222. For example, two moving means are provided on each of the right and left sides in case of a two-arm robot.

The configuration example illustrated in FIG. 2 and the function example described above with reference to FIG. 2 are only examples and the present invention is not limited thereto. The teleoperation assist system 1 may include, for example, another constituent.

(Task)

An example of a task will be described below.

I. A Pick and Place Task

This task is, for example, a task of picking a target on a plane, in a box, or the like and placing the target in another place (on a plane, in a box, or the like).

II. Peg-In-Hole Task

This task is, for example, a task of inserting a peg (a pin) in a hole. For example, a job of screwing a screw into a screw hole is included in this task.

III. Gear Inserting Task

This task is, for example, a task of inserting a gear onto a shaft.

IV. Contact-Rich Task

This task is a task with may contact points.

Two tasks including the pick and place task and the peg-in-hole task occupy 90% of general tasks. Accordingly, the intention estimating unit 31 may estimate the two tasks and classify the other tasks as other tasks.

(Target)

Target information will be additionally described below.

Target information includes, for example, a shape, a position, a size, and a name. For example, when the target is a watermelon, the target information includes information such as a position, a spherical body, a radius, watermelon, and a weight of a general watermelon based on the size.

For example, when the target is a button, the target information includes information such as a position, a hard button of which a top surface is planar, and a push button.

For example, when the target is a plastic bottle, the target information includes information such as a position, a plastic bottle with contents therein, a shape, a size, and a weight of a plastic bottle with general contents therein. When the task is a task of opening a cap of a plastic bottle, the target information also includes information such as a shape, a size, and a position of the cap.

(Intention Estimating Unit)

The intention estimating unit 31 will be additionally described below.

The intention estimating unit 31 estimates an operator's intention, for example, by estimating a target object (a target) and a task which is intended by the operator on the basis of the acquired information (for example, see Japanese Patent Application No. 2021-058952 for an intention estimating method). The intention estimating unit 31 estimates a target object, for example, on the basis of position information of fingertips and gaze information. The intention estimating unit 31 may estimate a target and a task additionally using position information of an object.

The intention estimating unit 31 may estimate an intention of a motion additionally using the moving means. In this case, the intention estimating unit 31 may estimate the intention of the operator's motion, for example, by inputting gaze information, movement information of a hand, and position information of an object on a table to the trained model 311.

Figure 3:
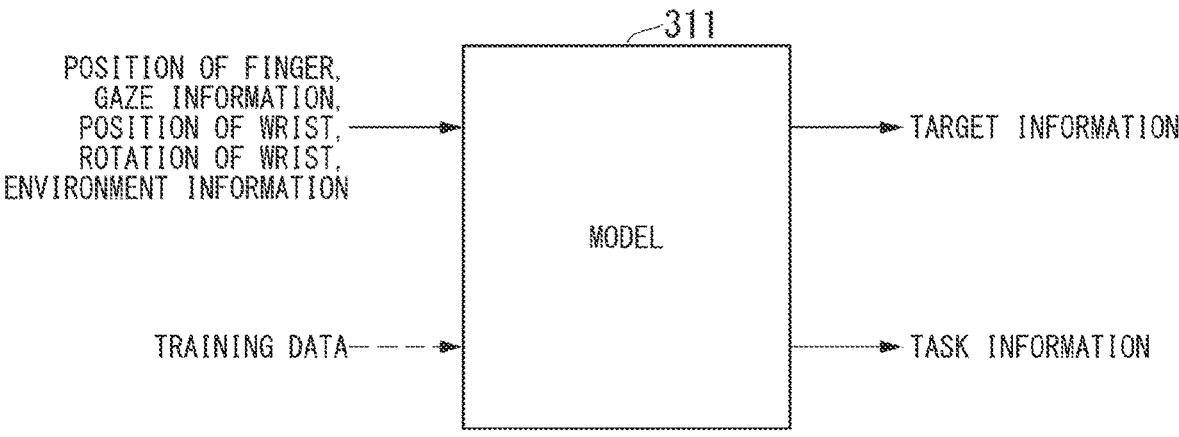
FIG. 3 is a diagram illustrating training and estimation of a model in an intention estimating unit according to the embodiment.

FIG. 3 is a diagram illustrating training and estimation of a model in the intention estimating unit according to this embodiment.

At the time of training, the model 311 is trained by inputting training data and a position of a finger, gaze information, a position of a wrist, rotation information of the wrist, and environmental information to the model 311. The environmental information includes, for example, a captured image and information obtained by recognizing a target object (for example, a position, a shape, and a size). The training data includes task information and target information.

At the time of estimation, the model 311 outputs target information and task information, for example, by inputting a position of a finger, gaze information, a position of a wrist, rotation information of the wrist, and environmental information.

The model 311 is, for example, a network such as a deep neutral network (DNN), a recurrent neural network (RNN), a convolutional neural network (CNN), a long/short-term memory (LSTM), or a generative adversarial network (GAM).

(Parameter Setting Unit)

The parameter setting unit 32 sets the parameters by inputting target information and task information to the trained model 321.

Figure 4:
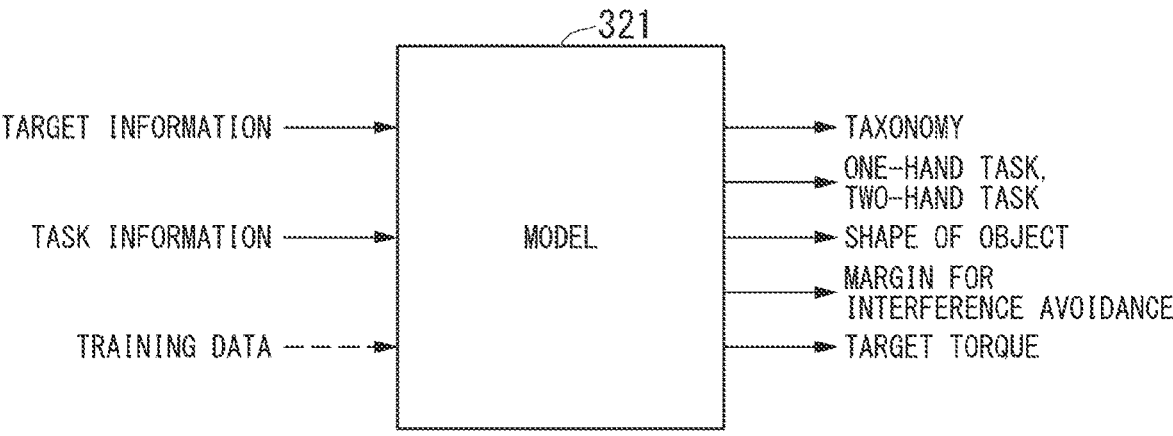
FIG. 4 is a diagram illustrating training and estimation of a model in a parameter setting unit according to the embodiment.

FIG. 4 is a diagram illustrating training and estimation of a model in the parameter setting unit according to this embodiment.

At the time of training, the model 321 is trained by inputting training data, target information, task information, and the like to the model 321. The training data includes, for example, taxonomy information, information indicating a one-hand task or a two-hand task, shape information of an object, a margin for excessive interference avoidance, and a target torque which are parameters.

At the time of estimation, the model 321 outputs the parameters by inputting target information, task information, and the like to the model 321.

Taxonomy in this embodiment is a classification of task details which are performed by remotely controlling the robot 2 (for example, see Reference Document 1). Accordingly, taxonomy information includes, for example, information such as what object is to be gripped with what posture of the end effector as will be described later.

> Reference Document 1: Thomas Feix, Javier Romero, et al., "The GRASP Taxonomy of Human Grasp Types" IEEE Transactions on Human-Machine Systems (Volume: 46, Issue: 1, February 2016), IEEE, p 66-77

Figure 5:
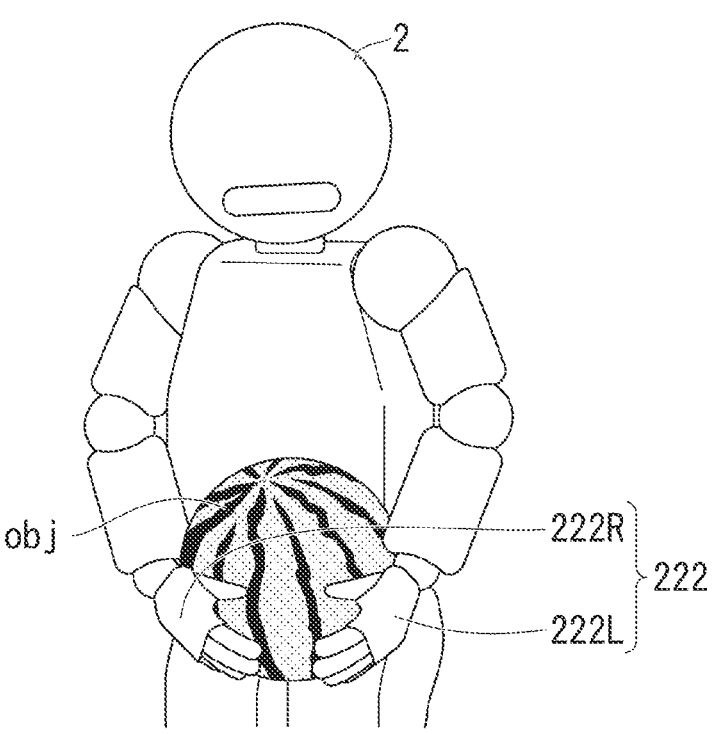
FIG. 5 is a diagram illustrating an example of a task of causing a robot to pick up and place a watermelon through teleoperation.

FIG. 5 is a diagram illustrating an example of a task of causing a robot to pick and place a watermelon through teleoperation.

In this task, for example, information indicating a watermelon (obj) with a weight of 5 kg as task information and information indicating picking and placing as target information are input to the parameter setting unit 32. The output of the parameter setting unit 32 includes, for example, information indicating a sphere with a radius of 0.2 m as object shape information, information indicating a two-hand task, information indicating an interference avoidance margin of 2 cm, information indicating that taxonomy is gripping of a spherical object, and information indicating that the target torque include 25 N for the left hand and 25 N for the right hand.

Figure 6:
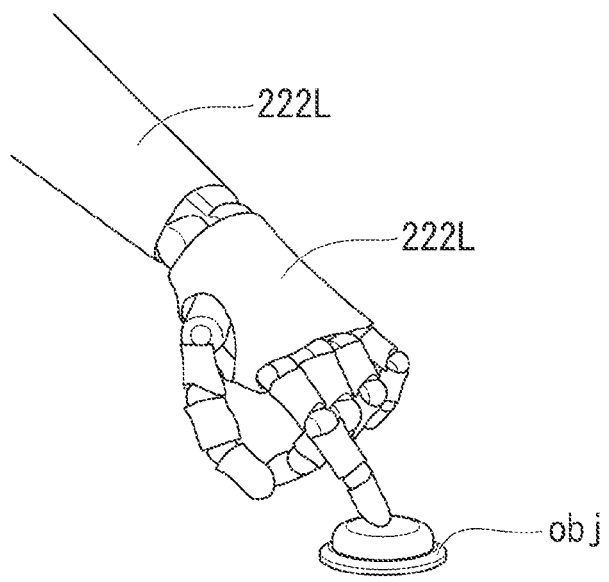
FIG. 6 is a diagram illustrating an example of a task of causing a robot to press a hard button through teleoperation.

FIG. 6 is a diagram illustrating an example of a task of causing a robot to press a hard button through teleoperation.

In this task, for example, information indicating a button (obj) as task information and information indicating pressing as target information are input to the parameter setting unit 32. The output of the parameter setting unit 32 includes, for example, information indicating a plane as object shape information, information indicating a one-hand task, information indicating that the interference avoidance margin is 0 cm and taxonomy is pressing of a planar hard object, and information indicating that the target torque is 10 N for the right hand.

(Routine of Processes)

A routine of processes which are performed by the teleoperation assist system 1 will be described below.

Figure 7:
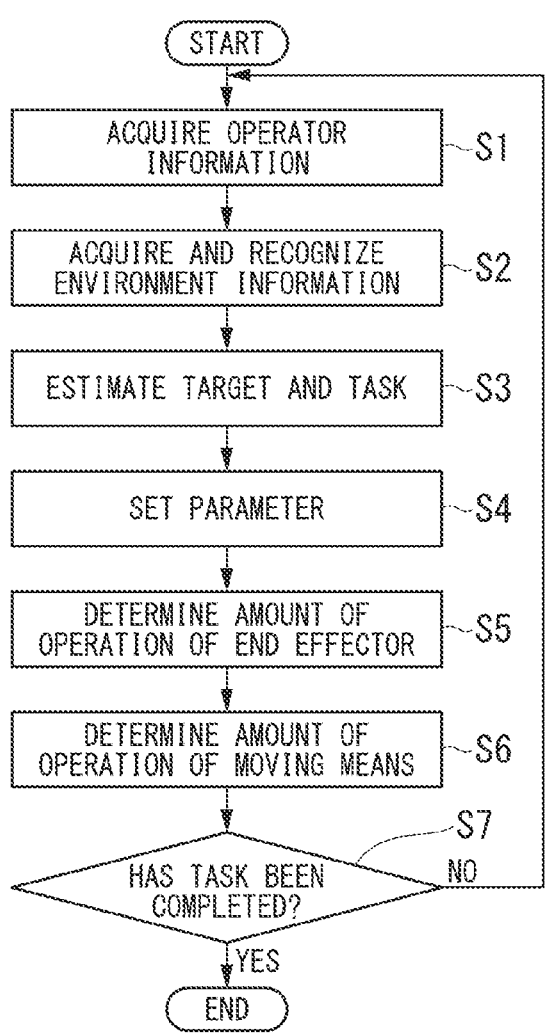
FIG. 7 is a flowchart illustrating a routine of processes which are performed by the teleoperation assist system according to the embodiment.

FIG. 7 is a flowchart illustrating a routine of processes which are performed by the teleoperation assist system according to this embodiment.

(Step S1) The motion acquiring unit 11 acquires operator information (such as movement information of a finger, position information of the finger, gaze information, position information of a wrist, and movement information of the wrist).

(Step S2) The environmental status determining unit 12 acquires environmental information (such as an RGB image and depth information) using the environmental sensor 71. The environmental status determining unit 12 recognizes a target object on the basis of the acquired environmental information.

(Step S3) The intention estimating unit 31 estimates a task and a target which are intended by the operator by inputting the acquired operator information and the environmental information to the trained model 311.

(Step S4) The parameter setting unit 32 sets parameters by inputting task information and target information acquired from the intention estimating unit 31 to the trained model 321.

(Step S5) The end effector operation determining unit 33 determines an amount of operation of the end effector 22 using detection information detected by the finger movement sensor 111 and taxonomy information set by the parameter setting unit 32.

(Step S6) The moving means operation determining unit 34 determines an amount of operation of the moving means 224 using detection information detected by the wrist movement sensor 113 and parameters set by the parameter setting unit 32.

(Step S7) The teleoperation assist device 3 determines whether the task has been completed. When it is determined that the task has been completed (Step S7: YES), the teleoperation assist device 3 ends the routine. When it is determined that the task has been completed (Step S7: NO), the teleoperation assist device 3 returns the routine to Step S1.

(Example of Obstacle)

An example in which an obstacle in addition to a target object is present at the time of performing a task will be described below.

Figure 8:
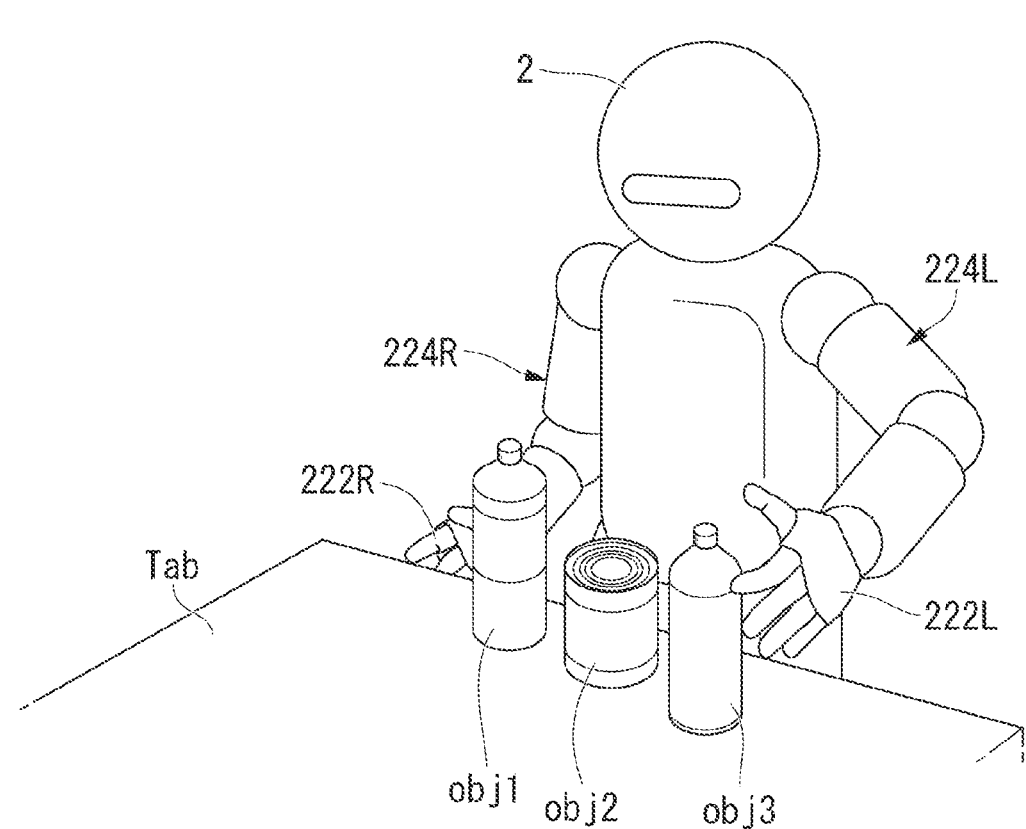
FIG. 8 is a diagram illustrating an example in which there is an obstacle.

FIG. 8 is a diagram illustrating an example in which there is an obstacle. In the example illustrated in FIG. 8, three objects (obj1, obj2, and obj3) are placed on a table Tab. For example, when a target is the object obj2 at the center and is gripped with the left end effector 222L and the moving means 224L, the object obj3 on the left side serves as an obstacle. Alternatively, when the target is gripped with the right end effector 222R and the moving means 224R, the object obj1 on the right side serves as an obstacle.

In this case, the environmental status determining unit 12 recognizes a position, a size, a shape, a name, and the like of the obstacle, for example, on the basis of a captured image. The intention estimating unit 31 may estimate that there is an obstacle against the target object and output, for example, target information indicating the object obj2 and task information indicating that the target object is gripped with the single left hand to avoid the obstacle to the parameter setting unit 32.

As described above, in this embodiment, gaze information of a human operator, position and posture information of a wrist, position and posture information of a finger, and environmental information may be acquired in teleoperation of the robot 2. In this embodiment, a target object (a target) and task details (a task) which are intended by the operator are estimated using the acquired information. In this embodiment, the parameters required for operation of the end effector 222 and the moving means 224 are determined using the estimated target information and the estimated task information.

Accordingly, according to this embodiment, it is not necessary to attach an exoskeleton which is expensive and hard to attach. According to this embodiment, it is possible to cope with various problems using a general structure.

Some or all of the processes which are performed by the teleoperation assist device 3 may be performed by recording a program for realizing some or all of the functions of the teleoperation assist device 3 according to the present invention on a computer-readable recording medium and causing a computer system to read and execute a program recorded on the recording medium. The "computer system" mentioned herein may include an operating system (OS) or hardware such as peripherals. The "computer system" may include a WWW system including a homepage provision environment (or a homepage display environment). Examples of the "computer-readable recording medium" include a portable medium such as a flexible disk, a magneto-optical disc, a ROM, or a CD-ROM and a storage device such as a hard disk incorporated in a computer system. The "computer-readable recording medium" may include a medium that holds a program for a predetermined time such as a nonvolatile memory (ROM) in a computer system serving as a server or a client when a program is transmitted via a network such as the Internet or a communication line such as a telephone line.

The program may be transmitted from a computer system storing the program in a storage device or the like to another computer system via a transmission medium or using carrier waves in the transmission medium. The "transmission medium" for transmitting a program is a medium having a function of transmitting information such as a network (a communication network) such as the Internet or a communication circuit (a communication line) such as a telephone circuit. The program may be a program for realizing some of the aforementioned functions. The program may be a so-called differential file (a differential program) which can realize the aforementioned functions in combination with another program stored in advance in the computer system.

While a mode for carrying out the present invention has been described above with reference to an embodiment, the present invention is not limited to the embodiment, and various modifications or replacements may be added thereto without departing from the gist of the present invention.

What is claimed is:

1. A teleoperation assist device that remotely operates at least an end effector representative of a human hand, the teleoperation assist device comprising:
 a moving means which moves the end effector; and
 a processor configured to:
  acquire information on a motion of an operator who operates the teleoperation assist device to cause, via the moving means, at least the end effector to move, the information on the motion of the operator including information of a position of a finger of the operator and a movement of the finger of the operator;
  acquire environment information with respect to a first environment in which the end effector is operated and a second environment in which the teleoperation assist device is operated;
  estimate a target object which is a target associated with what the operator intends to operate by the end effector and a task which is an operation method of the target object related to how the operator intends to operate, by inputting the information associated with the motion of the operator and the environment to a first model, the target object and the operator method changing according to the environment information;

set a first parameter associated with an operation type of the end effector and a second parameter associated with an operation of the moving means by inputting the estimate of the target object and the task which is the operation method of the target object to a second model;
  when a same object as the target object is not included in the second model, set the first parameter and the second parameter based on information of a similar object being similar to the target object in the second model;
  determine an amount associated with an operation of the end effector based on a grasp taxonomy of human grasp type representative of the first parameter and the information associated with the motion of the operator;
  determine an amount of operation associated with the moving means based on the second parameter, and the information associated with the motion of the operator.

2. The teleoperation assist device according to claim 1, wherein the first parameter and the second parameter comprise the taxonomy, object shape information of the target object, information indicating a task which is performed with a single hand, information indicating a task which is performed with two hands, margin information for interference avoidance, and a target torque.

3. The teleoperation assist device according to claim 1, wherein the processor is configured to:
  perform control such that the moving means is able to maintain a restricted motion along a surface of the target object using a wrist command value associated with a position and movement of a wrist of the operator, object shape information of the target object which is one of the first parameter and the second parameter, and information indicating a task which is performed with a single hand or information indicating a task performed with two hands which is the parameter;
  provide a target position and a target posture of the moving means using a command value and margin information for interference avoidance and generate a joint angle command value for the moving means; and
  generate a joint target torque command value using the joint angle command value and a target torque and control a torque of the moving means based on the joint target torque command value.

4. The teleoperation assist device according to claim 3, wherein the processor is configured to output an instruction to invalidate a process when a shape of the target object is atypical.

5. The teleoperation assist device according to claim 3, wherein a number of moving means and a number of end effectors are two or more,
 wherein the processor is configured to perform control such that a plurality of end effectors operate in cooperation, and
 wherein the processor is configured to perform control such that a plurality of moving means operate in cooperation.

6. The teleoperation assist device according to claim 1, wherein the information on the motion of the operator further includes information of a gaze of the operator, a position of a wrist of the operator, and movement of a wrist of the operator.

7. A teleoperation assist method that is performed by a teleoperation assist device remotely operating at least an end effector representative of a human hand, the teleoperation assist method comprising:
  acquiring information on a motion of an operator who operates the teleoperation assist device to cause at least the end effector to move, via a moving means, wherein the information on the motion of the operator includes information of a position of a finger of the operator and a movement of the finger of the operator;

acquiring environment information of with respect to a first environment in which the end effector is operated and a second environment in which the teleoperation assist device is operated;

estimating a target object which is a target associated with what the operator intends to operate by the end effector and a task which is an operation method of the target object related to how the operator intends to operate, by inputting the information associated with the motion of the operator and the environment information to a first model, the target object and the operator method changes according to the environment information;

setting a first parameter associated with an operation type of the end effector and a second parameter associated with an operation of the moving means by inputting an estimate of the target object and the task which is the operation method of the target object to a second model;

when a same object as the target object is not included in the second model, set the first parameter and the second parameter based on information of a similar object being similar to the target object in the second model;

determining an amount associated with an operation of the end effector based on a grasp taxonomy of human grasp type representative of the first parameter and the information associated with the motion of the operator;

determining an amount of operation associated with the moving means based on the second parameter, and the information associated with the motion of the operator.

8. A non-transitory computer-readable storage medium storing a program causing a computer of a teleoperation assist device remotely operating at least an end effector representative of a human hand to perform:

acquiring information on a motion of an operator who operates the teleoperation assist device to cause, via a moving means, at least the end effector and the moving means to move, wherein the information on the motion of the operator includes information of a position of a finger of the operator and a movement of the finger of the operator;

acquiring environment information of with respect to a first environment in which the end effector is operated and a second environment in which the teleoperation assist device is operated;

estimating a target object which is a target associated with what the operator intends to operate by the end effector and a task which is an operation method of the target object related to how the operator intends to operate, by inputting information associated with the motion of the operator and the environment information to a first model, the target object and the operator method changes according to the environment information;

setting a first parameter associated with an operation type of the end effector and a second parameter associated with an operation of the moving means by inputting an estimate of the target object and the task which is the operation method of the target object to a second model;

when a same object as the target object is not included in the second model, set the first parameter and the second parameter based on information of a similar object being similar to the target object in the second model;

determining an amount associated with an operation of the end effector based on a grasp taxonomy of human grasp type representative of the first parameter and the information associated with the motion of the operator;

determining an amount of operation associated with the moving means based on the second parameter, and the information associated with the motion of the operator.

* * * * *